| United States Patent [19] | [11] Patent Number: 5,061,670 |
| --- | --- |
| Forquy et al. | [45] Date of Patent: Oct. 29, 1991 |

[54] PROCESS FOR THE PREPARATION OF A CATALYST CAPABLE OF PROMOTING THE OXIDATIVE CONVERSION OF METHANE INTO HIGHER HYDROCARBONS AND USE OF CATALYST

[75] Inventors: Christian Forquy, Artiguelouve; Didier Tichit, Montpelliek; Didier Anglerot, Pau, all of France

[73] Assignee: 501 Societe Nationale Elf Aquitaine, Courbevoie, France

[21] Appl. No.: 460,961

[22] PCT Filed: Jun. 27, 1989

[86] PCT No.: PCT/FR89/00332

§ 371 Date: Feb. 23, 1990

§ 102(e) Date: Feb. 23, 1990

[87] PCT Pub. No.: WO90/00086

PCT Pub. Date: Jan. 11, 1990

[30] Foreign Application Priority Data

Jun. 29, 1988 [FR] France ................................ 88 08766

[51] Int. Cl.$^5$ .......................... C07C 2/00; B01J 27/232
[52] U.S. Cl. .................................. 585/500; 585/943; 502/302; 502/303
[58] Field of Search ....................... 502/302, 303, 174; 423/165, 430; 585/500, 943

[56] References Cited

U.S. PATENT DOCUMENTS

| 3,024,199 | 3/1962 | Pasfield | 502/302 X |
| 3,404,100 | 10/1968 | Taylor et al. | 502/303 |
| 3,839,225 | 10/1974 | Acres | 502/303 X |
| 3,885,020 | 5/1975 | Whelan | 502/303 |
| 3,888,792 | 6/1975 | Hughes | 502/303 |
| 4,460,705 | 7/1984 | Terauchi et al. | 502/303 |
| 4,517,398 | 5/1985 | Sofranko | 585/500 |
| 4,613,718 | 9/1986 | Jaecker et al. | 585/500 |
| 4,656,155 | 4/1987 | Josefowicz | 502/302 X |
| 4,695,668 | 9/1987 | Velenyi | 585/943 X |
| 4,826,796 | 5/1989 | Erekson | 502/303 X |

FOREIGN PATENT DOCUMENTS

| 62-129227 | 6/1987 | Japan | 585/500 |
| 8607351 | 12/1986 | World Int. Prop. O. | 585/500 |

OTHER PUBLICATIONS

*Kirk-Othmer Encyclopedia of Chemical Technology*, 3rd Ed., 1978, vol. 3, p. 457, and vol. 9, p. 743.
Keller, G. E., "Synthesis of Ethylene via Oxidative Coupling of Methane", J. of Catalysis, 73, 9–19 (1982).

*Primary Examiner*—W. J. Shine
*Assistant Examiner*—D. J. McGinty
*Attorney, Agent, or Firm*—Burgess, Ryan & Wayne

[57] ABSTRACT

A process is provided for the preparation of a catalyst which is particualrly active and selective in the oxidative conversion of methane into higher hydrocarbons and especially into $C_2{}^+$ hydrocarbons.

In the process, an aqueous phase containing in solution cations of at least one metal of the lanthanide group and cations of at least one alkaline-earth metal, is brought into contact with a sufficient quantity of a source of carbonate ions or hydroxide ions to form a coprecipitate of carbonates and/or of hydroxycarbonates of the metals, the pH of the resulting reaction medium is brought to a value higher than 8, a coprecipitate is separated from the reaction medium, subjected to a washing operation, then to a drying operation and the washed and dried coprecipitate is subjected to calcination.

27 Claims, No Drawings

PROCESS FOR THE PREPARATION OF A CATALYST CAPABLE OF PROMOTING THE OXIDATIVE CONVERSION OF METHANE INTO HIGHER HYDROCARBONS AND USE OF CATALYST

BACKGROUND OF THE INVENTION

1.) Field of the Invention

The invention relates to a process for the preparation of a catalyst capable of promoting the oxidative conversion of methane into $C_2^+$ hydrocarbons with a high activity and selectivity.

2.) Background of the Related Art

There is at present no industrial-scale process which makes it possible directly to convert methane, a hydrocarbon which has a limited field of application, into higher hydrocarbons such as ethylene, which are capable of many utilizations in various fields of the chemical industry.

However, there are many catalyst systems which have been proposed within recent years, for converting methane, in the presence of oxygen, into high hydrocarbons and especially into $C_2^+$ hydrocarbons, which are mixtures of ethylene, ethane and of small quantities of hydrocarbons containing at least three carbon atoms in the molecule, this operation of conversion of methane into higher hydrocarbons being commonly called an oxidative conversion or oxidative coupling of methane.

Thus, for the selective conversion of methane into $C_2^+$ in the presence of oxygen, reference DE-A-3,237,079 proposes to employ a catalyst based on PbO and on $SiO_2$, and reference EP-A-0,196,541 describes the use of an Li/MgO catalyst, in the formulation of which the lithium is generally introduced in the form of carbonate. Such catalysts rapidly lose their activity at the temperatures needed to activate methane, which are of the order of 750° C., given that at these temperatures PbO is eliminated by sublimation and lithium carbonate is unstable and decomposes.

In reference EP-A-0,189,079, a catalyst based on rare earths in the form of oxides is proposed for performing the conversion of methane in the presence of oxygen. The results of the tests presented in this reference show that the use of a catalyst of this kind does not make it possible to reach a sufficient yield of ethylene and ethane. In fact, the selectivity for these two hydrocarbons is high at a low degree of conversion of methane, but it quickly decreases when the conversion increases. The use of the said catalyst appears therefore to be of little economic interest for an industrial application of the oxidative conversion of methane into higher hydrocarbons.

Reference WO-A-86/07,351 proposes to perform the conversion of methane in the presence of oxygen by employing a catalyst based on rare-earth oxides doped by adding oxides of metals of groups IA and IIA of the Periodic Table of the Elements, and this makes it possible to work with space velocities of the methane/oxygen mixture which are markedly higher than those envisaged in reference EP-A-0,189,079 and to attain higher degrees of conversion of methane with improved selectivities for hydrocarbons.

It has been found that a mixture of oxides of metals of groups IA and IIA and of rare-earth metals was not the most appropriate form for constituting an active and selective catalyst for oxidative conversion of methane into $C_2^+$ hydrocarbons, and that it was possible to obtain a catalyst based on the said metals exhibiting improved performance, when the catalyst preparation process passed through a stage of coprecipitation of these metals in the form of carbonates and/or hydroxycarbonates.

SUMMARY OF THE INVENTION

The invention proposes, therefore, a particular process for the preparation of a catalyst containing at least one metal of the lanthanide group and at least one alkaline-earth metal, which makes it possible to obtain a catalyst which is particularly active and selective in the oxidative conversion of methane into higher hydrocarbons and especially into $C_2^+$ hydrocarbons.

The process according to the invention is characterized in that an aqueous phase containing in solution cations of at least one metal of the lanthanide group and of at least one alkaline-earth metal is brought into contact with a sufficient quantity of a source of carbonate ions and optionally of a source of hydroxide ions to form a coprecipitate of carbonates and/or of hydroxycarbonates of the said metals, containing at least 5% by weight of carbonates and to bring the pH of the resulting reaction medium to a value higher than 8, the coprecipitate is separated from the reaction medium and the said coprecipitate is subjected to a washing operation and then to a drying operation and the washed and dried coprecipitate is subjected to a calcination at a temperature of between 400° C. and 1000° C.

Advantageously, before separating the coprecipitate from the reaction medium, the said reaction medium containing the coprecipitate is kept at a temperature ranging from 60° C. to 150° C. for a period of between 30 minutes and 30 hours and preferably between 2 hours and 20 hours.

DESCRIPTION OF THE PREFERRED EMBODIMENTS

The metals of the lanthanide group which are capable, according to the invention, of providing some of the cations in solution in the aqueous phase are the metals of the Periodic Table of the Elements which have the atomic numbers 57 and 59 to 71, the said metals being especially such as lanthanum, praseodymium, neodymium, samarium, europium, gadolinium, terbium, dysprosium, erbium, holmium, thulium, ytterbium and lutetium.

The alkaline-earth metals capable, according to the invention, of providing the cations used in combination with the cations of the metal(s) of the lanthanide group are the metals of group IIA of the Periodic Table of the Elements including beryllium, magnesium, calcium, strontium and barium.

The respective proportions of cations of the metal(s) of the lanthanide group and of cations of the alkali-earth metal(s) in the aqueous phase may vary quite widely. In particular, the respective weight percentages L of the metal(s) of the lanthanide group and E of the alkaline-earth metal(s) in the total of these two types of metals are such that $6 \leq L \leq 98$ and $2 \leq E \leq 94$ with $L + E = 100\%$.

Cations of one or more metals other than the metals of the lanthanide group and alkaline-earth metals, especially scandium, yttrium and lithium may also be present in the aqueous phase in addition to the cations of the alkaline-earth metals and the cations of the lanthanide group. The quantity of these additional cations represents up to 30% and preferably up to 15% of the total weight of the cations originating from the metal(s) of the lanthanide group and from the alkaline-earth metal(s).

The source of the cations which are present in the aqueous phase consists of water-soluble compounds, for example chlorides, of the abovementioned metals.

The source of carbonate ions may be chosen from the various carbonates which are water-soluble in the concentrations employed, especially alkali metal carbonates such as sodium carbonate and potassium carbonate, ammonium carbonate and quaternary ammonium carbonates.

Similarly, the source of hydroxide ions may be chosen from the various hydroxides which are water-soluble in the concentrations employed, especially alkali metal hydroxides such as sodium and potassium hydroxides, and quaternary ammonium hydroxides.

The proportion of source of carbonate ions which is employed by itself or the respective proportions of the sources of carbonate ions and of hydroxide ions are chosen in particular so that the coprecipitate resulting from bringing the said carbonate or carbonate and hydroxide ions into contact with the cations present in the aqueous phase may contain 5% to 100% by weight of carbonates and so that the pH of the reaction medium may be brought to a value ranging from 9.5 to 13.5.

The cations present in the aqueous phase may be brought into contact with the carbonate ions or with the carbonate ions and the hydroxide ions giving rise to the coprecipitate of carbonates or of carbonates and hydroxycarbonates in any appropriate manner. For example, the source of carbonate ions, when employed by itself, may be added, in aqueous solution, to the aqueous phase containing the cations, it being possible for the said addition to be performed in one or more fractions or else continuously. When a source of carbonate ions and a source of hydroxide ions are employed together to form the coprecipitate, the source of hydroxide ions and the source of carbonate ions may be added, in aqueous solution, either successively or mixed or else simultaneously and separately, to the aqueous phase containing the cations, it being possible for each addition to be performed in one or more fractions or else continuously.

An advantageous way of bringing the cations present in the aqueous phase into contact with the carbonate ions or with the carbonate ions and the hydroxide ions giving rise to the coprecipitate consists in continuously mixing the aqueous phase containing the cations with an alkaline aqueous phase containing, in solution, either the source of carbonate ions or the source of carbonate ions and the source of hydroxide ions, in the appropriate concentrations, while controlling the flow rates of the aqueous phases brought together so that the coprecipitate formed may contain at least 5% by weight of carbonates and that the pH of the reaction medium formed may be maintained at a substantially constant value throughout the coprecipitation, the said value being higher than 8 and preferably ranging from 9.5 to 13.5.

The coprecipitate resulting from bringing the cations of the metals such as those referred to above into contact with the carbonate ions or with the carbonate ions and the hydroxide ions and optionally subjected to the stage of being kept at a temperature of 60° C. to 150° C. is separated from the reaction medium by any known method, for example filtration or centrifuging, and is then subjected to a washing with distilled or demineralized water until the interfering ions are completely eliminated, for example chloride ions, introduced by the sources of cations and is dried in a conventional manner at temperatures ranging, for example, from 60° C. to 90° C.

The calcination of the dried coprecipitate is carried out by heating the said coprecipitate to temperatures of between 400° C. and 1000° C. as indicated above and preferably ranging from 450° C. to 800° C., it being possible for the said heating to be carried out in air or in inert atmosphere.

The calcined coprecipitate is shaped by any known technique, for example by a pelleting technique, to form the catalyst which can be employed in catalytic reactors.

The product whose preparation has just been described is a catalyst which is particularly active and selective for the conversion of methane, in the presence of oxygen, into high hydrocarbons and especially into $C_2^+$ hydrocarbons.

The methane which is subjected to the oxidative catalytic conversion may be pure methane or else methane containing up to 10% by volume of ethane, as is the case with industrial natural gas.

The oxygen reacted with the methane is preferably pure oxygen, because the use of air as a source of oxygen, although possible, demands a separation of nitrogen before the unconverted methane is recycled.

The methane and the oxygen may be brought into contact with the catalyst either in the form of separate streams or in the form of a preformed mixture. The quantities of methane and of oxygen which are brought together are such that the molar ratio of methane to oxygen may have a value ranging from 1 to 20 and preferably from 2 to 10.

The catalyst prepared according to the invention makes it possible to use the methane conversion reaction at temperatures of between 600° C. and 1100° C. without catalyst decomposition. According to the invention, preferred temperatures for this reaction range from 700° C. to 900° C.

The pressures which may be employed for using the said reaction are not critical. They may be especially between approximately 1 and approximately 50 bars and may preferably lie between 1 and 20 bars.

The space velocity of the gaseous mixture of methane and oxygen in contact with the catalyst, expressed in liters of gaseous mixture per gram of catalyst per hour may, according to the invention, have a value of between 3 and 1000. Preferred space velocities have values ranging from 5 to 300.

The invention is illustrated by the following examples, given without any limitation being implied.

EXAMPLE 1

An aqueous solution of barium cations and of lanthanum cations was prepared by dissolving 0.25 moles of $BaCl_2.2H_2O$ and 0.125 moles of $LaCl_3.6H_2O$ in 1 liter of distilled water and the solution obtained was placed in a 2-1 round bottom flask purged with a stream of nitrogen.

An aqueous solution containing 0.25M/l of NaOH and 0.25M/l of $Na_2CO_3$ was added dropwise to the contents of the round bottom flask, kept at ambient temperature and with continuous stirring, so as to precipitate the barium and lanthanum cations in the form of a coprecipitate of carbonate and of hydroxycarbonate, the rate of addition of the said solution being controlled so as to obtain a reaction medium with a pH equal to 10 after an addition period of 2 hours.

The resulting reaction medium containing the coprecipitate formed was then heated to 90° C. and kept at this temperature, the stirring being continued, for a period of 16 hours.

The coprecipitate was then separated from the reaction medium by filtration, was then washed with distilled water until the chlorides were completely eliminated and was finally dried at 60° C.

The dried precipitate was then subjected to a calcination at 500° C. in the presence of air.

The composition of the calcined product, defined as metal oxides and as carbonate equivalents expressed as $CO_2$, is given below as a percentage by weight:

$La_2O_3$: 63.6%, BaO: 7.2% and $CO_2$: 29.2%.

EXAMPLE 2

The operation was carried out as shown in Example 1, starting with an aqueous solution of barium cations and of lanthanum cations, which was prepared by dissolving 0.278 moles of $BaCl_2.2H_2O$ and 0.139 moles of $LaCl_3.6H_2O$ in 1 liter of distilled water.

The composition of the product obtained by calcination of the dried coprecipitate, defined as metal oxides and as carbonate equivalents expressed as $CO_2$, was the following, in percentage by weight: $La_2O_3$: 55%, BaO: 27% and $CO_2$: 18%.

EXAMPLE 3

An aqueous solution of barium cations and of lanthanum cations was prepared by dissolving 0.6 moles of $BaCl_2.2H_2O$ and 0.2 moles of $LaCl_3.6H_2O$ in 1 liter of distilled water.

An aqueous precipitating solution was also prepared by dissolving 3.2 moles of NaOH and $8 \times 10^{-3}$ moles of $Na_2CO_3$ in 1 liter of distilled water.

The aqueous solution of cations, on the one hand, and the precipitating aqueous solution for precipitating the cations in the form of a coprecipitate of carbonate and of hydroxycarbonate, on the other hand, were introduced continuously, simultaneously and separately into a 2-liter round bottom flask purged with a stream of nitrogen, the operation being carried out at ambient temperature and with stirring, the flow rates of the solutions introduced into the round bottom flask being controlled to maintain the pH of the reaction medium resulting from bringing the said solutions into contact at a constant value equal to 13.

After the introduction of 800 ml of aqueous solution of cations into the round bottom flask, the addition of the said solution and that of the precipitating solution were stopped and the reaction medium was still kept stirred until the precipitation of the cations was complete.

The reaction medium containing the coprecipitate was then heated to 80° C. and kept at this temperature for a period of 5 hours, still being stirred.

The coprecipitate was then separated from the reaction medium by filtration, it was then washed with distilled water until the chlorides were completely eliminated and was finally dried at 60° C.

The dried precipitate was then subjected to a calcination at 500° C. in the presence of air. The calcined product formed consisted of a barium lanthanum oxycarbonate.

The composition of the said calcined product, defined as shown in Example 1, was the following, in percentage by weight: $La_2O_3$: 38.8%, BaO: 53.9% and $CO_2$: 7.3%.

EXAMPLE 4

An aqueous solution of magnesium cations and of samarium cations was prepared by dissolving 0.75 moles of $MgCl_2.6H_2O$ and 0.25 moles of $SmCl_3.6H_2O$ in 1 liter of distilled water.

An aqueous precipitating solution was also prepared by dissolving 1.6 moles of NaOH and 0.01 moles of $Na_2CO_3$ in 1 liter of distilled water.

The aqueous solution of cations, on the one hand, and the precipitating aqueous solution for precipitating the cations in the form of a coprecipitate of carbonate and of hydroxycarbonate, on the other hand, were introduced dropwise, simultaneously and separately, into a 2-liter round bottom flask purged with a stream of nitrogen, the operation being carried out at constant temperature and with stirring, the flow rates of the solutions introduced into the round bottom flask being controlled so as to maintain the pH of the reaction medium resulting from bringing the said solutions into contact at a constant value equal to 10.

After the introduction of 800 ml of aqueous solution of cations into the round bottom flask, the addition of the said solution and that of the precipitating solution were stopped and the reaction medium was still kept stirred until the precipitation of the cations was complete.

The reaction medium containing the coprecipitate was then heated to 70° C. and kept at this temperature, stirred continuously, for a period of 18 hours.

The coprecipitate was then separated from the reaction medium by filtration, was then washed with distilled water until the chlorides were completely eliminated and was finally dried at 60° C.

The dried precipitate was then calcinated at 500° C. in the presence of air.

The resulting calcined product consisted of a magnesium samarium oxycarbonate.

The composition of the said calcined product, defined as shown in Example 1, was the following, in percentage by weight: $Sm_2O_3$: 48.7%, MgO: 34.4% and $CO_2$: 16.9%.

EXAMPLE 5

An aqueous solution of barium cations and of samarium cations was prepared by dissolving 0.75 moles of $BaCl_2.2H_2O$ and 0.25 moles of $SmCl_3.6H_2O$ in 1 liter of distilled water.

An aqueous precipitating solution was also prepared by dissolving 10 moles of NaOH and 0.12 moles of $Na_2CO_3$ in 1 liter of distilled water.

The aqueous solution of cations, on the one hand, and the precipitating aqueous solution for precipitating the cations in the form of a coprecipitate of carbonate and of hydroxycarbonate, on the other hand, were introduced dropwise, simultaneously and separately, into a 2-liter round bottom flask purged with a stream of nitrogen, the operation being carried out at ambient temperature and with stirring, the flow rates of the solutions introduced into the round bottom flask being controlled so as to maintain the pH of the reaction medium resulting from bringing the said solutions into contact at a constant value equal to 13.

After the introduction of 800 ml of aqueous solution of cations into the round bottom flask, the addition of the said solution and that of the precipitating solution were stopped and the reaction medium was still kept stirred until the precipitation of the cations was complete.

The reaction medium containing the coprecipitate was then heated to 70° C. and kept at this temperature, stirred continuously, for a period of 18 hours. The coprecipitate was then separated from the reaction medium by filtration, was then washed with distilled water until the chlorides were completely eliminated and was finally dried at 60° C.

The dried precipitate was then calcined at 500° C. in the presence of air. The resulting calcined product consisted of a barium samarium oxycarbonate.

The composition of the said calcined product, defined as shown in Example 1, was the following, in percentage by weight: $Sm_2O_3$: 53.3%, BaO: 25% and $CO_2$: 21.7%.

EXAMPLE 6

The calcined solids obtained in Examples 1 to 5 according to the invention were employed as catalysts in trials of oxidative conversion of methane into higher hydrocarbons.

Control tests were also performed by employing the following products as catalysts:

Product A: Lanthanum oxide $La_2O_3$ containing 7.2% by weight of BaO and obtained by impregnating lanthanum oxide with the appropriate quantity of aqueous solution of barium nitrate, followed by drying of the impregnated product at 110° C. for 12 hours and finally calcination at 600° C. for 4 hours to provide lanthanum oxide ($La_2O_3$) particles having a surface layer containing barium oxide (BaO).

Product B: Barium carbonate obtained by precipitation, by mixing equal volumes of a 0.2M aqueous solution of $BaCl_2.2H_2O$ and of a 0.2M aqueous solution of $Na_2CO_3$, followed successively by isolating the precipitate by filtration, washing the precipitate with distilled water until the chlorides were eliminated, drying at 60° C. for 24 hours and finally calcination at 600° C. for 4 hours in air to provide barium carbonate ($BaCO_3$).

Product C: Lanthanum oxycarbonate obtained by precipitation, by mixing equal volumes of a 0.2M aqueous solution of $LaCl_3.6H_2O$ and of a 0.2M aqueous solution of sodium carbonate, followed in succession by isolating the precipitate by filtration, washing the precipitate with distilled water until, the chlorides were eliminated, drying at 60° C. for 24 hours and finally calcination at 600° C. for 4 hours in air to provide lanthanum oxycarbonate, $La_2O(CO_3)_2$.

The trials of oxidative catalytic conversion of methane were carried out as follows.

The operation was carried out with a device comprising a tubular reactor mounted in a furnace provided with a temperature control system, one of the ends of the reactor being connected to a delivery line for gaseous mixture, equipped with a flowmeter, and the other end of the reactor being connected to a condenser, maintained at 0° C. and itself connected to a sampling system of a chromatographic analyser.

A mixture of 2 g of the chosen catalyst, the said catalyst being in the form of particles which have a particle size range from 1 to 2 mm, and of quartz grains in a volumetric ratio of the catalyst to the quartz equal to 1:2, was placed in the tubular reactor and held in place in the said reactor by quartz lamé plugs. In the reactor, the catalyst mixture occupied a position which placed the said mixture substantially in the middle of the heating zone of the furnace when the reactor was placed in the furnace.

The furnace containing the reactor charged with the catalyst mixture was brought up to the temperature required for the trial, and a gaseous mixture, preheated to 450° C. and consisting of methane and of pure oxygen in an appropriate molar ratio was injected into the reactor through the gas delivery line, the said gaseous mixture travelling at a space velocity controlled by the flowmeter fitted on the gas delivery line. At the exit of the reactor the gaseous reaction mixture resulting from the conversion was cooled in the condenser and was then directed towards the sampling system of the chromatographic analyser for the purpose of qualitative and quantitative analyses.

The operating conditions specific to each trial and the results obtained are collated in the table below.

TABLE

| SOURCE OF THE CATALYST | MOLAR RATIO $CH_4:O_2$ | CONVERSION TEMPERATURE (°C) | SPACE VELOCITY ($l\,g^{-1}\,h^{-1}$) | PERCENTAGE CONVERSION | | | | SELECTIVITY (% CARBON) | | | |
|---|---|---|---|---|---|---|---|---|---|---|---|
| | | | | $CH_4$ | $O_2$ | $C_2H_4$ | $C_2H_6$ | $C_3$ | $C_2^+$ | CO | $CO_2$ |
| EXAMPLE 1 | 6 | 752 | 30.1 | 21.5 | 99.8 | 37.5 | 31.1 | 3.4 | 72 | 3 | 25 |
| EXAMPLE 2 | 6 | 738 | 33.1 | 18.9 | 99.9 | 42.5 | 25.7 | 2.3 | 70.5 | 3.4 | 26.1 |
| EXAMPLE 3 | 6 | 750 | 30.3 | 16 | 91.7 | 17.2 | 22.2 | 2.5 | 41.9 | 2.6 | 55.3 |
| EXAMPLE 3 | 6 | 837 | 180 | 16.3 | 92.4 | 23.6 | 36.1 | 3.2 | 62.9 | 4.5 | 32.6 |
| EXAMPLE 4 | 6 | 746 | 5.1 | 15.7 | 99.9 | 20.1 | 29.3 | | 49.4 | 12.3 | 38.3 |
| EXAMPLE 5 | 6 | 750 | 26 | 18.1 | 99.9 | 35.2 | 30.5 | 2.5 | 68.2 | 3.8 | 28 |
| Product A | 6 | 782 | 15 | 19.1 | 99.8 | 25.6 | 30.9 | 3.5 | 60 | 6.9 | 33.1 |
| Product B | 10 | 800 | 5.1 | 10.1 | 84.6 | 31.7 | 28.6 | | 60.3 | 4 | 35.7 |
| Product C | 10 | 750 | 5.1 | 10.4 | 99.4 | 22.4 | 22.1 | 2.1 | 46.6 | 5.8 | 47.6 |

Comparison of the results which appear in the Table brings into prominence the improved performance of the catalysts according to the invention. In particular, for comparable contents of barium oxide, the catalyst prepared in Example 1 results in a degree of methane conversion which is slightly higher with a selectivity for $C_2+$ hydrocarbons which is substantially improved when compared with what is obtained when employing Product A as catalyst, that is to say a product containing the elements barium and lanthanum in the form of oxides. Furthermore, the catalysts according to the invention result in degrees of methane conversion which are substantially higher than those obtained in comparable conditions with catalysts consisting of barium carbonate (Product B) or of lanthanum carbonate (Product C), without the selectivity for hydrocarbons being affected. Moreover, the catalysts according to the invention make it possible to work at high space velocities.

We claim:

1. A process for the preparation of a catalyst which contains at least one metal of the lanthanide group and at least one alkaline-earth metal and wherein at least part of said metals are in the form of carbonates and/or oxycarbonates, said process comprising, 1) contacting:
   (a) an aqueous phase containing in solution cations of at least one metal of the lanthanide group having the atomic numbers 57 and 59 to 71 in the Periodic Table of the Elements and cations of at least one alkaline-earth metal, with
   (b) a sufficient quantity of a source of carbonate ions and optionally of a source of hydroxide ions to form a coprecipitate of carbonates and/or of hydroxycarbonates of the said metals, containing at least 5% by weight of carbonates and to bring the pH of the resulting reaction medium to a value higher than 8;
2) separating the coprecipitate from the reaction medium and subjecting said coprecipitate to a washing operation;
3) drying said coprecipitate; and
4) subjecting said coprecipitate to calcination at a temperature of between 400° C. and 1000° C.

2. Process according to claim 1, where, before separating the coprecipitate from the reaction medium, the reaction medium containing the coprecipitate is kept at a temperature ranging from 60° C. to 150° C. for a period of between 30 minutes and 30 hours.

3. Process according to claim 1 wherein the metal of the lanthanide group is selected from the group consisting of lanthanum, praseodymium, neodymium, samarium, europium, gadolinium, terbium, dysprosium, erbium, holmium, thulium, ytterbium and lutetium.

4. Process according to claim 1 wherein the alkaline-earth metal or metals are selected from the group consisting of beryllium, magnesium, calcium, strontium and barium.

5. Process according to claim 1 wherein the respective weight percentages L of the metal(s) of the lanthanide group and E of the alkaline-earth metal(s) providing the cations present in the aqueous phase in the total of the said metals are chosen so that $6 \leq L \leq 98$ and $2 \leq E \leq 94$ with $L + E = 100\%$.

6. Process according to claim 1 wherein in addition to the cations of the metal(s) of the lanthanide group and of the cations of the alkaline-earth metal(s), the aqueous phase also contains in solution up to 30% of the total weight of the cations originating from the metal(s) of the lanthanide group and from the alkaline-earth metal(s), of additional cations of at least one other metal selected from the group consisting of lithium, scandium and yttrium.

7. Process according to claim 6 wherein the quantity of the said additional cations represents up to 15% of the total weight of the cations originating from the metal(s) of the lanthanide group and from the metal(s) of the lanthanide group and from the alkaline-earth metal(s).

8. Process according to claim 1 wherein the source of carbonate ions is chosen from alkali metal carbonates, ammonium carbonate and quaternary ammonium carbonates.

9. Process according to claim 1 wherein the source of hydroxide ions is chosen from alkali metal hydroxides and quaternary ammonium hydroxides.

10. Process according to claim 6 wherein the proportion of source of carbonate ions or the respective proportions of the sources of carbonate ions and of hydroxide ions are chosen so that the coprecipitate resulting from bringing the said ions into contact with the cations present in the aqueous phase may contain 5% to 100% by weight of carbonates and so that the pH of the reaction medium may be brought to a value ranging from 9.5 to 13.5.

11. Process according to claim 1 wherein the cations present in the aqueous phase are brought into contact solely with a source of carbonate ions which is added in the form of an aqueous solution to the said aqueous phase, the said addition being performed in one or more fractions or continuously.

12. Process according to claim 1 wherein with cations present in the aqueous phase are brought into contact with a source of hydroxide ions and a source of carbonate ions, the said bringing into contact being carried out by adding the source of hydroxide ions and the source of carbonate ions, in the form of aqueous solutions, either successively or mixed or else simultaneously and separately, to the aqueous phase containing the cations, each addition being performed in one or more fractions or else continuously.

13. Process according to claim 1 wherein the bringing into contact of the cations present in the aqueous phase with the carbonate ions or with the carbonate ions and the hydroxide ions is performed by continuously mixing the aqueous phase containing the cations with an alkaline aqueous phase containing in solution either the source of carbonate ions or the source of carbonate ions and the source of hydroxide ions, in the appropriate concentrations, the flow rates of the aqueous phases brought together being controlled so that the coprecipitate formed may contain at least 5% by weight of carbonates and that the pH of the reaction medium produced may be maintained at a substantially constant value throughout the coprecipitation, the said value being higher than 8.

14. Process according to claim 1 wherein the coprecipitate separated from the reaction medium is washed with distilled or demineralized water until the interfering ions are completely eliminated.

15. Process according to claim 1 wherein the washed coprecipitate is dried at temperatures ranging from 60° C. to 90° C.

16. Process according to claim 1 wherein the dried coprecipitate is calcined at temperatures ranging from 450° C. to 800° C.

17. Process for oxidative conversion of methane into higher hydrocarbons in which a gaseous mixture containing methane and oxygen is passed in contact with a catalyst, at a temperature of between 600° C. and 1100° C., wherein the said catalyst is a catalyst obtained by the process according to claim 1.

18. Process according to claim 17, wherein the molar ratio of methane to oxygen in the gaseous mixture brought into contact with the catalyst has a value ranging from 1 to 20.

19. Process according to claim 17 wherein the temperature for implementing the conversion has a value ranging from 700° C. to 900° C.

20. Process according to claim 17 wherein the space velocity of the gaseous mixture based on methane and oxygen in contact with the catalyst assumes values which, expressed in liters of gaseous mixture per grams of catalyst per hour, are between 3 and 1000.

21. Process according to claim 17 wherein the conversion is performed at pressures of between approximately 1 bar and approximately 50 bars.

22. Process according to claim 1, where, before separating the coprecipitate from the reaction medium, the reaction medium containing the coprecipitate is kept at a temperature ranging from 60° C. to 150° C. for a period of between 2 hours and 20 hours.

23. Process according to claim 1, wherein the bringing into contact of the cations present in the aqueous phase with the carbonate ions or with the carbonate ions and the hydroxide ions is performed by continuously mixing the aqueous phase containing the cations with an alkaline aqueous phase containing in solution either the source of carbonate ions or the source of carbonate ions and the source of hydroxide ions, in the appropriate concentrations, the flow rates of the aqueous phases brought together being controlled so that the coprecipitate formed may contain at least 5% by weight of carbonates and that the pH of the reaction medium produced may be maintained at a substantially constant value throughout the coprecipitation, the said value ranging from 9.5 to 13.5.

24. Process according to claim 17, wherein the molar ratio of methane to oxygen in the gaseous mixture brought into contact with the catalyst has a value ranging from 2 to 10.

25. Process according to claim 17, wherein the space velocity of the gaseous mixture based on methane and oxygen in contact with the catalyst assumes values which, expressed in liters of gaseous mixture per gram of catalyst per hour, are between 5 and 300.

26. Process according to claim 17, wherein the conversion is performed at pressures of between approximately 1 bar and 20 bars.

27. Process according to claim 1, wherein in addition to the cations of the metal(s) of the lanthanide group and of the cations of the alkaline-earth metal(s), the aqueous phase also contains in solution additional cations of at least one other metal selected from the group consisting of scandium, yttrium and lithium.

* * * * *

UNITED STATES PATENT AND TRADEMARK OFFICE
CERTIFICATE OF CORRECTION

PATENT NO. : 5,061,670
DATED : October 29, 1991
INVENTOR(S) : Christian Forquy, et al It is certified that error appears in the above-identified patent and that said Letters Patent is hereby corrected as shown below:

Cover page, item [75]: "Montpelliek" should read --Montpellier-- item [73] Assignee: should read --SOCIETE NATIONALE ELF AQUITAINE, Courbevoie, France and ELF AQUITAINE NORGE, Stavanger, Norway.-- item [57] in the Abstract, line 2: "particualrly" should read --particularly--

Column 2, line 56: "alkali-earth" should read --alkaline earth--

Column 9, in Claim 7, lines 54 and 55: cancel "from the metal(s) of the lanthanide group and"

Column 9, in Claim 10, line 64: "claim 6" should read --claim 1--

Column 10, in Claim 12, line 11: "with" should read --the--

Signed and Sealed this

Fifth Day of October, 1993

*Attest:*

BRUCE LEHMAN

*Attesting Officer*    *Commissioner of Patents and Trademarks*